United States Patent
Jin

(10) Patent No.: US 7,327,793 B2
(45) Date of Patent: Feb. 5, 2008

(54) DMT PEAK REDUCTION WITHOUT AFFECTING TRANSMISSION SIGNAL

(75) Inventor: Gary Qu Jin, Kanata (CA)

(73) Assignee: RIM Semiconductor, Portland, OR (US)

( * ) Notice: Subject to any disclaimer, the term of this patent is extended or adjusted under 35 U.S.C. 154(b) by 659 days.

(21) Appl. No.: 10/085,061

(22) Filed: Mar. 1, 2002

(65) Prior Publication Data

US 2002/0159550 A1 Oct. 31, 2002

(30) Foreign Application Priority Data

Mar. 2, 2001 (GB) ................................. 0105185.3

(51) Int. Cl.
*H04K 1/10* (2006.01)
*H04L 27/28* (2006.01)

(52) U.S. Cl. ...................... 375/260; 375/346; 370/203; 370/210

(58) Field of Classification Search ................ 375/260, 375/346; 370/203, 210
See application file for complete search history.

(56) References Cited

U.S. PATENT DOCUMENTS 5,835,536 A 11/1998 May et al.
6,175,551 B1 1/2001 Awater et al.
6,366,555 B1 * 4/2002 Gatherer et al. ............ 370/210
6,424,681 B1 * 7/2002 Tellado et al. .............. 375/296
6,529,925 B1 * 3/2003 Schenk ....................... 708/300

FOREIGN PATENT DOCUMENTS

| | | |
|---|---|---|
| DE | 198 50 642 A1 | 5/2000 |
| EP | 0 719 001 A1 | 6/1996 |
| EP | 0 725 510 A1 | 8/1996 |
| EP | 0 932 285 A2 | 7/1999 |
| EP | 1 195 962 A2 | 4/2002 |
| EP | 1302045 | 4/2003 |
| JP | 2000516431 | 7/1998 |
| JP | 2000115123 | 4/2000 |

OTHER PUBLICATIONS

DMT signals with low peak-to-average power ratio Zekri et al.; Computers and Communications, 1999. Proceedings. IEEE International Symposium on Jul. 6-8, 1999 pp. 362-368 Digital Object Identifier 10.1109/ISCC.1999.780920.*
"Controlling clipping probability in DMT transmission", Alan Gatherer et al., IEEE, 1998, pp. 578-584.
"PAR reduction in multicarrier transmission systems", Jose Tellado et al., Dec. 8, 1997, pp. 1-14.

* cited by examiner

*Primary Examiner*—Ted Wang

(57) ABSTRACT

In a method of effecting peak reduction in a DMT signal, a predetermined signature waveform is first produced. This is then subtracted from the DMT signal in the region of a signal peak whenever the DMT signal is above a predetermined maximum level.

16 Claims, 1 Drawing Sheet

$n = 0, ..., 255$
$n_1 = I - 128 + n'$

DMT PEAK REDUCTION WITHOUT AFFECTING TRANSMISSION SIGNAL

BACKGROUND OF THE INVENTION

1. Field of the Invention

This invention relates to the field of data communication, and in particular to a method of reducing signal peaks in a Discrete Multitone (DMT) signal.

2. Description of Related Art

DMT or Discrete Multitone is a multicarrier transmission technique that uses a Fast Fourier Transform (FFT) and inverse FFT to allocate transmitted bits among many narrow narrowband QAM modulated tones depending on the transport capacity of each tone. This of course can vary with transmission conditions. As is known in the art, QAM (Quadrature Amplitude Modulation) is a passband modulation technique wherein information is represented as changes in carrier phase and amplitude.

DSL or Digital Subscriber Line is a system wherein a non-loaded local loop provides a copper connection between a network service provider and customer premises. DMT is a common form of modulation used in DSL systems. In a DMT based DSL system, the required peak-to average ration (PAR) of a signal is 15 dB for the probability of a clipping occurring to be $10^{-8}$ (assuming a Gaussian distribution).

A large PAR value will seriously reduce the signal dynamic range. On the one hand, any peak value will cause signal saturation and the error will spread at all frequency subcarriers. In the worst case, the entire frame of a signal can be wiped out. On the other hand, if the PAR is increased so that the signal has less chance of being clipped, the dynamic range is lost. For the case where PAR=15 dB, the signal will normally be transmitted 15 dB below its peak level.

In a DMT system, multiple QAM constellations are modulated on different carrier frequencies. In the time domain, the signal has variable levels. Normally, the maximum peak-to-average ratio ranges from 27 dB to 39 dB depending on the size of FFT. To increase the signal dynamic range and reduce the PAR, several methods have been used in DMT based DSL systems. The most efficient method is to use a special waveform known as a signature waveform. This is a time domain signal which has a large peak in it and is otherwise small at other time instants. Whenever the signal is larger than a maximum level, the signature waveform is subtracted from the signal so that the signal will not be saturated. However, addition of the signature waveform will generally cause distortion to the transmission signal.

Prior art peak reduction systems are described, for example, in J. Tellado and J. Cioffi, "PAR Reduction in Multicarrier Transmission System", ANSI Contribution T1E1.4/97-367, Sacramento, Calif., December 1997; and A. Gatherer and M. Polley, "Controlling Clipping Probability in DMT Transmission", 1997 Asilomar Conference, November, 1997, the contents of which are herein incorporated by reference.

An object of the invention is to alleviate this problem.

SUMMARY OF THE INVENTION

Embodiments of the invention provide a signature waveform which introduces no or minimum signal distortion. The signature waveform is designed so that whenever the signal is above a maximum level, the signature waveform is subtracted from the signal peak position. As a result, the signal will not be saturated. The advantages of such a signature waveform design are that the PAR can be reduced by as much as 6 dB, and no distortion is introduced into the transmission signal. The transmission signal has no distortion after peak deduction.

Accordingly the present invention provides a method of effecting peak reduction in a DMT signal, comprising the steps: (i) providing a predetermined signature waveform (s(n)), (ii) for each frame of samples of the DMT signal, identifying a maximal value of amplitude (M) and the location (I) of said maximal value within said frame, (iii) comparing the maximal value with a threshold value and, if the maximal value is not less than the threshold value, (iv) multiplying the predetermined signature waveform by a scaling factor (C) to obtain a scaled signature waveform, and (v) subtracting said scaled signature waveform from said DMT signal frame so as to reduce said peak to a level substantially equal to said predetermined threshold value.

In a preferred embodiment the signature waveform is generated by an iterative process whereby a predetermined starting waveform is passed repeatedly through time domain and frequency domain restriction units.

Typically the signature waveform is aligned with the time domain DMT output signal and multiplied by a scaling factor derived from the maximal value of the time domain DMT output signal. The result is passed through a bit shifter to match the number of bits per sample of the result with the number of bits in the samples of the time domain DMT signal.

The invention also provides an arrangement for effecting peak reduction in a DMT signal, comprising: (i) means for providing a predetermined signature waveform (s(n)), (ii) means for identifying, for each frame of samples of the DMT signal, a maximal value of amplitude (M) and the location (I) of said maximal value within said frame, (iii) means for comparing the maximal value with a threshold value and, if the maximal value is not less than the threshold value, (iv) means for multiplying the predetermined signature waveform by a scaling factor (C) to obtain a scaled signature waveform, and (v) means for subtracting said scaled signature waveform from said DMT signal frame so as to reduce said peak to a level substantially equal to said predetermined threshold value.

BRIEF DESCRIPTION OF THE DRAWINGS

An embodiment of the invention will now be described in more detail, by way of example only, with reference to the accompanying drawings, in which.

DETAILED DESCRIPTION OF THE PREFERRED EMBODIMENTS

As noted above, the object of the invention is to reduce the PAR (Peak-to-average ratio) of a signal to be transmitted. In accordance with the principles of the invention this is achieved by subtracting a signature waveform from the signal whenever the signal is above a predetermined maximum level or threshold value (T). As a result, the signal will not be saturated.

The invention uses a few bits and a short vector for the signature waveform so that both the memory and computation requirements are minimized. Also, by carefully choosing the value of a scaling factor C, as defined below, it is possible to achieve the maximum PAR reduction by 6 dB and maintain minimum signal distortion. The signature waveform s(n) is represented by a 256 byte vector (256.times.8 bits) with a maximal value of 0x7f(0x indicates hexadecimal notation, so, for example, 7f would be 01111111 in binary notation).

Figure 1:
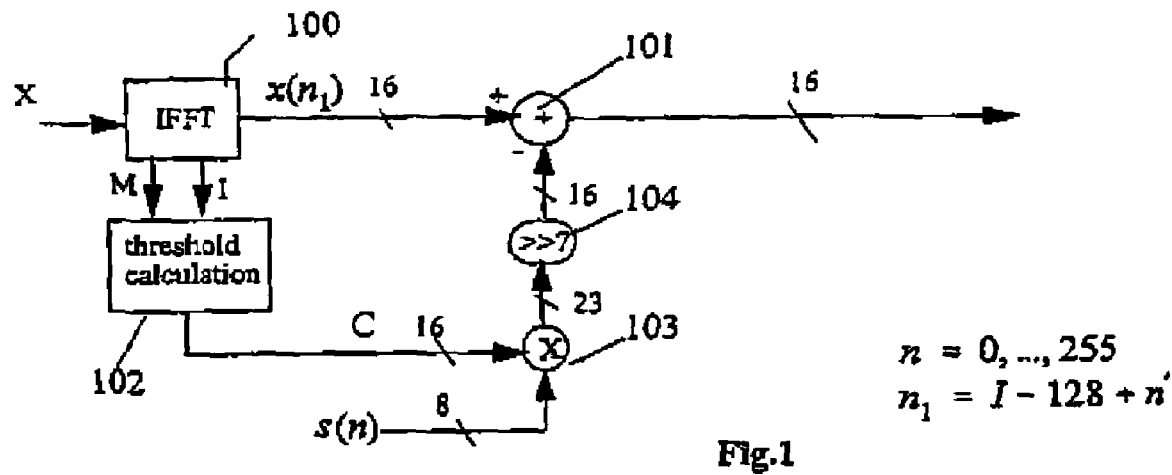
FIG. 1 shows one embodiment of a circuit for reducing the PAR of a signal.

Referring now to FIG. 1, a practical implementation of the invention comprises an IFFT (Inverse Fast Fourier Transform) unit 100 which receives a frequency domain DMT input signal X and outputs a time domain DMT signal $x(n_1)$, which is represented as 16 bit numbers. The time domain DMT signal $x(n_1)$ is fed to a subtractor 101.

In the meantime, the IFFT 100 unit calculates the absolute maximal value |M| of the amplitude of the samples in a frame of the DMT signal $x(n_1)$ together with the address I of its location in the series of samples in the frame, and supplies them to a threshold calculation unit 102, which compares the absolute maximal value |M| with a predetermined maximum level or threshold 0x04000 T, for example 0xXXXX for a 16 bit signal, and outputs a scaling factor C which is used to scale a signature waveform s(n). If the absolute maximal value (|M|) of the time domain signal ($x(n_1)$) is smaller than threshold T, no action is required for PAR reduction, and the threshold calculator 102 sets scaling factor C to zero. Hence, following multiplication, the signature waveform also will be zero. Otherwise, if the absolute maximal value |M| is equal to or greater than threshold T, the threshold calculator 102 outputs a scaling factor C having a value derived as follows:

If |M| is larger than 0x7FFF, |M| is first saturated to 0x7FFF.

While the signature waveform is to be subtracted from the signal ($x(n_1)$), it must first be aligned with the signal peak bearing in mind that the signature waveform is only 256 bytes long. It must also be remembered that the signature waveform consists of only 8 bit samples whereas the signal consists of 16 bit samples.

Alignment of the signature waveform with the peak is achieved by taking IFFT output samples at addresses $n_1$ ranging from [I−128: I+127] (before the prefix, suffix and window are added), and subtracting the signature waveform multiplied by the scaling factor C where C is determined as follows:

$$C \begin{cases} (|M|-T) \times sgn(M) & |M| \geq T \\ 0 & |M| < T \end{cases}$$

The address $n_1$ for IFFT output x should be cyclically extended, i.e., if $n_1<0$, the true address should be $n_1+N$, where N is the number of FFT points (For a normal DMT based DSL system, N=512, 1024, 2048, 4096 and 8192), and if $n_1>N-1$, the true address should be $n_1-N$.

The signature waveform s(n), which consists of 8 bit samples, is then multiplied byte scaling factor C, which consists of 16 bit samples, in multiplier 103. The result is a 23 bit number which is shifted 7 bits to the right in unit 104 to give a 16 bit number that is subtracted from $x(n_1)$ by subtractor 101.

Figure 2:
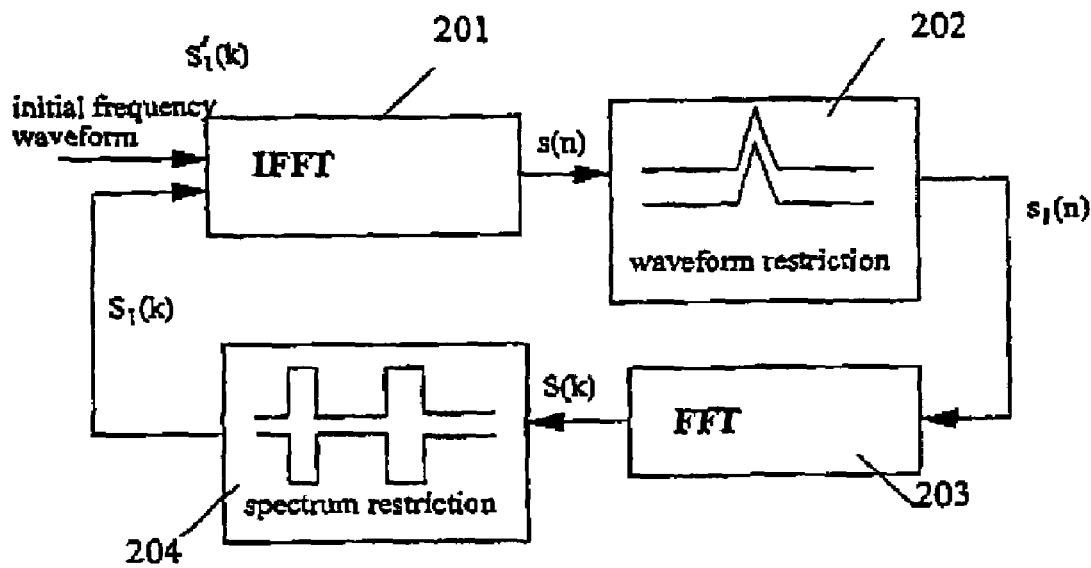
FIG. 2 is a block diagram illustrating the calculation of a signature waveform.

The signature waveform calculation is illustrated in FIG. 2. First an initial frequency domain waveform $S_1'(k)$ is selected and passed through an IFFT unit 201 to produce a time domain signature waveform s(n). This waveform is then compared with a waveform restriction profile in unit 202 and any time domain samples which are outside the profile are limited to the profile value, producing a modified time domain signal $s_1(n)$. This signal $s_1(n)$ is passed through FFT unit 203 to produce a frequency domain waveform S(k).

This signal S(k) is then checked against a required frequency mask in unit 204 and any frequency components of the signal that are outside the mask are corrected to comply with the mask requirements. The output $S_1(k)$ of unit 204 is passed back into the IFFT 201 and the process repeated on an iterative basis until either the waveform change becomes insignificant between successive iterations or a maximum number of iterations is reached.

An example of a time domain waveform restriction profile for unit 202 is:

$$s_1(n) = \begin{cases} 1, & n = 128; \\ s(n), & |s_1(n)| \leq 0.5, n \neq 128 \\ 0.5 \times sgn(s(n)), & |s_1(n)| > 0.5, n \neq 128 \end{cases}$$

In the above equation, it is assumed that the center point of the signature waveform is centered at n=128 and the waveform restriction profile includes a threshold that is a constant 0.5.

An example of frequency domain mask for unit 204 is:

$$S_1(k) = \begin{cases} S(k), & k \text{ is the region 1 or within the required frequency mask} \\ \gamma_1 \times sgn(S_1(k)), & k \text{ is in region 2 and } |S_1(k)| > \gamma_1 \\ \gamma_2(k) \times sgn(S_1(k)), & k \text{ is in region 3 and } |S_1(k)| > \gamma_2 \end{cases}$$

where $\gamma_1$ and $\gamma_2$ are preset thresholds.

An example of frequency domain mask for unit 204 is:

$$S_1(k) = \begin{cases} S(k), & k \text{ is in region 1 or small than required threshold} \\ \gamma_1 \times sgn(S_1(k)), & k \text{ is in region 2 and } |S_1(k)| > \gamma_1 \\ \gamma_2(k) \times sgn(S_1(k)), & k \text{ is in region 3 and } |S_1(k)| > \gamma_2 \end{cases}$$

Here, the region 1 belongs to transmitter frequency band which is not used. This band can be used for signature waveform with no constraints. The region 2 belongs to the receiver frequency band and the corresponding threshold $\gamma_1$ is set such that it is equal to the required transmitter spectrum mask for the receive band, or in case there is no restriction on the transmit signal on the receiver band, $\gamma_1$ is set such that the generated echo signal to the receiver band is smaller than the requirement. The region 3 belongs to the transmitter band where data bits are modulated and $\gamma_2(k)$ is set as the ⅙ to ¼ of the constellation distance which differs for different frequency subcarriers (k).

The above threshold selection will ensure that the signature waveform uses all possible frequency bands so that it can best approach an impulse function. At the same time, it will not violate any frequency requirements and will cause no signal distortion to both the far end and the near end receivers.

The invention provides an effective implementation for PAR reduction. The signature waveform design is such that it best approaches the impulse function and at the same time causes no or minimal distortion to both the transmitter and receiver signals.

The method described can be implemented with small amount of memory and fewer computations. By employing suitable parameters, the PAR reduction can be maximized.

The iterative method for the signature waveform creation ensures an optimal choice for the signature waveform. All possible frequency band are employed to create the optimum signature waveform.

I claim:

1. A method of effecting peak reduction in a Discrete Multitone signal, comprising the steps of:
   (i) providing a predetermined signature waveform;
   (ii) for each frame of samples of the DMT signal ($x(n_1)$), identifying an absolute maximal value |M| of amplitude of said samples and the location (I) of said absolute maximal value within said frame, said absolute maximal value corresponding to a signal peak,
   (iii) comparing the absolute maximal value with a predetermined threshold value and, if the absolute maximal value is not less than the predetermined threshold value (T),
   (iv) multiplying the predetermined signature waveform by a scaling factor (C) to obtain a scaled signature waveform, and
   (v) subtracting said scaled signature waveform from said DMT signal frame in the region of said signal peak so as to reduce said peak to a level substantially equal to said predetermined threshold value,
   wherein said predetermined signature waveform has fewer samples than said DMT signal, and said predetermined signature waveform is aligned with said signal peak prior to subtraction, said predetermined signature waveform first being multiplied by the scaling factor (C) to match said DMT signal, and said scaling factor (C) being determined from said absolute maximal value |M| in accordance with the equation $$C \begin{cases} (|M| - T) \times sgn(M) & |M| \geq T \\ 0 & |M| < T \end{cases}.$$

2. A method as claimed in claim 1, wherein the result of multiplying the scaling factor with said predetermined signature waveform is first shifted to match the number of bits per sample in the result with the number of bits representing the DMT signal $x(n_1)$.

3. A method of effecting peak reduction in a Discrete Multitone signal, comprising the steps of:
   creating a predetermined signature waveform, and
   subtracting said predetermined signature waveform from said DMT signal $x(n_1)$ in the region of a signal peak whenever the DMT signal is above a predetermined threshold value(T)
   wherein said predetermined signature waveform is generated by passing a predetermined waveform through a waveform modifying circuit on an iterative basis until the modified waveform change is insignificant between successive iterations or a maximum number of iterations is reached; and
   wherein said waveform modifying circuit comprises
      an Inverse Fast Fourier Transform (IFFT) unit to produce said predetermined signature waveform s(n) in the time domain,
      a waveform restriction unit to produce a modified time domain signature waveform signal $s_1(n)$,
      an FFT unit to produce a frequency domain modified waveform signal (S(k)) and
      a spectrum restriction unit to produce a band limited frequency signal ($S_1(k)$) which is passed back to said IFFT unit as part of said iterative process.

4. An arrangement for effecting peak reduction in a Discrete Multitone signal, comprising:
   a first unit for creating a predetermined signature waveform, and
   a second unit for subtracting said predetermined signature waveform from said DMT signal in the region of a signal peak whenever the DMT signal is above a predetermined threshold value,
   wherein said second unit comprises an IFFT unit for transforming an input frequency domain DMT signal to obtain said DMT signal which is applied to a subtractor,
   said Inverse Fast Fourmier Transform (IFFT) unit has two additional outputs representing respectively an absolute maximal value and location of said absolute maximum value |M| in said DMT signal,
   and wherein said additional outputs are applied to respective inputs of a threshold calculation unit that generates a scaling factor for said signature waveform when said absolute maximal value is above said predetermined threshold value, and
   wherein said first unit comprises
      an IFFT unit for generating a time domain signal from a predetermined input waveform,
      a time domain waveform restriction unit,
      an FFT unit for producing a modified frequency domain waveform, and
      a spectrum limiting unit for said modified frequency domain waveform, an output of said spectrum limiting unit being applied to an input of said IFFT unit to permit generation of said signature waveform by means of an iterative process.

5. A method of effecting peak reduction in a Discrete Multitone signal, comprising the steps of:
   (i) providing a predetermined signature waveform;
   (ii) for each frame of samples of the DMT signal ($x(n_1)$), identifying an absolute maximal value |M| of amplitude of said samples and the location (I) of said absolute maximal value |M| within said frame, said absolute maximal value corresponding to a signal peak,
   (iii) comparing the absolute maximal value with a predetermined threshold value (T) and, if the absolute maximal value is not less than the threshold value (T),
   (iv) multiplying the predetermined signature waveform by a scaling factor (C) to obtain a scaled signature waveform, and
   (v) subtracting said scaled signature waveform from said DMT signal frame in the region of said signal peak so as to reduce said peak to a level substantially equal to said predetermined threshold value,
   wherein said predetermined signature waveform is generated by passing a predetermined waveform through a waveform modifying circuit on an iterative basis until the modified waveform change is insignificant between successive iterations or a maximum number of iterations is reached.

6. A method according to claim 5, wherein the sealing factor (C) is derived from the absolute maximal value |M| and the threshold value (T).

7. A method as claimed in claim 5, wherein a frequency domain input DMT signal is passed through an Inverse Fast Fourier Transform (IFFT) unit which produces a time domain DMT signal $x(n_1)$ and derives said absolute maximal value |M| and said location.

8. A method as claimed in claim 5, wherein said predetermined signature waveform has fewer samples than said DMT signal, and said predetermined signature waveform is first aligned with said signal peak prior to subtraction.

9. A method as claimed in claim 8, wherein said predetermined signature waveform is first multiplied by a scaling factor (C) to match said DMT signal.

10. A method as claimed in claim 9, wherein said scaling factor (C) is determined from said absolute maximal value |M|.

11. A method of effecting peak reduction in a Discrete Multitone signal, comprising the steps of:
  (i) providing a predetermined signature waveform;
  (ii) for each frame of samples of the DMT signal ($x(n_1)$), identifying an absolute maximal value |M| of amplitude of said samples and the location (I) of said absolute maximal value |M| within said frame, said absolute maximal value |M| corresponding to a signal peak,
  (iii) comparing the absolute maximal value with a predetermined threshold value (T) and, if the absolute maximal value is not less than the threshold value (T),
  (iv) multiplying the predetermined signature waveform by a scaling factor (C) to obtain a scaled signature waveform, and
  (v) subtracting said scaled signature waveform from said DMT signal frame in the region of said peak so as to reduce said peak to a level substantially equal to said predetermined threshold value (T),
  wherein the scaling factor (C) is determined from the absolute maximal value |M| and the threshold value (T) in accordance with the equation $$C \begin{cases} (|M| - T) \times sgn(M) & |M| \geq T \\ 0 & |M| < T \end{cases}.$$

12. A method of effecting peak reduction in a Discrete Multitone signal, comprising the steps of:
  (i) providing a predetermined signature waveform;
  (ii) for each frame of samples of the DMT signal ($x(n_1)$), identifying an absolute maximal value |M| of amplitude of said samples and the location (I) of said absolute maximal value |M| within said frame, said absolute maximal value |M| corresponding to a signal peak,
  (iii) comparing the absolute maximal value with a threshold value (T) and, if the absolute maximal value is not less than the threshold value (T),
  (iv) multiplying the predetermined signature waveform by a scaling factor (C) to obtain a scaled signature waveform, and
  (v) subtracting said scaled signature waveform from said DMT signal frame in the region of said signal peak so as to reduce said peak to a level substantially equal to said predetermined threshold value,
  wherein the scaled predetermined signature waveform is passed through a bit shifter to match the number of bits per sample thereof with the number of bits in the samples of the time domain DMT signal ($x(n_1)$).

13. An arrangement for effecting peak reduction in a Discrete Multitone signal, comprising:
  (i) means for providing a predetermined signature waveform;
  (ii) means for identifying, for each frame of samples of the DMT signal ($x(n_1)$), an absolute maximal value |M| of amplitude of said samples and the location (I) of said absolute maximal value within said frame, said absolute maximal value |M| corresponding to a signal peak,
  (iii) means for comparing the absolute maximal value |M| with a threshold value (T),
  (iv) means operable, if the absolute maximal value is not less than the threshold value, for multiplying the predetermined signature waveform by a scaling factor (C) to obtain a scaled signature waveform, and
  (v) means for submitting said scaled signature waveform from said DMT signal frame in the region of said signal peak so as to reduce said peak to a level substantially equal to said predetermined threshold value,
  wherein said predetermined signature waveform generating means generates said predetermined signature waveform by passing a predetermined waveform through a waveform modifying circuit on an iterative basis until the modified waveform change is insignificant between successive iterations or a maximum number of iterations is reached.

14. An arrangement as claimed in claim 13, wherein said identifying means comprises an IFFT unit for transforming an input frequency domain DMT signal to obtain a time domain DMT signal which is applied to a subtractor and means for identifying said absolute maximal value |M| and said location.

15. An arrangement for effecting peak reduction in a DMT signal according to claim 13, wherein:
  the subtracting means subtracts said predetermined signature waveform from said DMT signal in the region of a signal peak whenever the DMT signal is above a predetermined threshold value, and
  wherein an Inverse Fast Fourier Transform (IFFT) unit is provided for generating a time domain signal from said DMT signal which is applied to a subtractor,
    said IFFT unit having two additional outputs representing respectively the absolute maximal value |M| and location of said absolute maximal value in said DMT signal, and
  wherein said additional outputs are applied to respective inputs of at threshold calculation unit that generates said scaling factor for said predetermined signature waveform when said absolute maximal value is above said predetermined threshold value.

16. An arrangement for effecting peak reduction in a Discrete Multitone signal, comprising:
  means for creating a predetermined signature waveform, and
  means for subtracting said predetermined signature waveform from said DMT signal in the region of a signal peak whenever the DMT signal ($x(n_1)$) is above a predetermined threshold value (T),
  wherein said predetermined signature waveform creating means generates the predetermined signature waveform by passing a predetermined waveform through a waveform modifying circuit on an iterative basis until the modified waveform change is insignificant between successive iterations or a maximum number of iterations is reached, and wherein said waveform modifying circuit comprises
  an Inverse Fast Fourier Transform (IFFT) unit to produce said signature waveform s(n) in the time domain,
  a waveform restriction unit to produce a modified time domain signature waveform signal $s_1(n)$,
  an FFT unit to produce a frequency domain modified waveform signal S(k) and
  a spectrum restriction unit to produce a band limited frequency signal $S_1(k)$ which is passed back to said IFFT unit as part of said iterative process.

\* \* \* \* \*